(12) United States Patent
Weems et al.

(10) Patent No.: US 7,469,803 B2
(45) Date of Patent: Dec. 30, 2008

(54) GREASE GUN WITH REMOTE-FEED ADAPTER

(75) Inventors: R. Mark Weems, Cedar Rapids, IA (US); Don R. Linkletter, Cedar Rapids, IA (US)

(73) Assignee: Weems Industries, Marion, IA (US)

( * ) Notice: Subject to any disclaimer, the term of this patent is extended or adjusted under 35 U.S.C. 154(b) by 513 days.

(21) Appl. No.: 11/104,819

(22) Filed: Apr. 13, 2005

(65) Prior Publication Data

US 2005/0230429 A1  Oct. 20, 2005

Related U.S. Application Data

(60) Provisional application No. 60/562,355, filed on Apr. 15, 2004.

(51) Int. Cl.
*G01F 11/00* (2006.01)
*F01M 11/04* (2006.01)

(52) U.S. Cl. .............. 222/262; 222/383.1; 222/327; 222/309; 184/105.2; 184/28

(58) Field of Classification Search ................ 222/401, 222/402, 256, 74, 527, 327, 383.1, 372, 378, 222/309, 262, 257, 258, 261, 263, 383.3, 222/260; 184/105.2, 28, 45.2, 38.2, 105.1
See application file for complete search history.

(56) References Cited

U.S. PATENT DOCUMENTS

| | | | | | |
|---|---|---|---|---|---|
| 1,339,237 | A | * | 5/1920 | Thompson | 222/263 |
| 1,463,861 | A | * | 8/1923 | Winkley | 141/382 |
| 1,721,817 | A | * | 7/1929 | Goodman | 222/256 |
| 1,750,148 | A | * | 3/1930 | Zabriskie | 222/256 |
| 1,828,317 | A | * | 10/1931 | Clapp | 222/108 |
| 1,856,372 | A | * | 5/1932 | Conrad | 222/262 |
| 2,242,288 | A | * | 5/1941 | Davis | 222/61 |
| 2,545,319 | A | * | 3/1951 | Sundholm | 222/256 |
| 2,810,496 | A | * | 10/1957 | Gray | 222/254 |
| 5,067,591 | A | * | 11/1991 | Fehlig | 184/55.1 |

* cited by examiner

*Primary Examiner*—Kevin P Shaver
*Assistant Examiner*—Stephanie E. Tyler
(74) *Attorney, Agent, or Firm*—Wenzel & Harms, P.C.; Allan L. Harms

(57) ABSTRACT

A portable grease gun with the capability of being attached to either a grease containing barrel or a hose carrying grease from a grease supply container. An adapter may be mounted to the barrel mounting in place of a barrel to couple the grease gun to a hose connected to a grease supply container remote from the grease gun. The grease gun includes an output valve which restrains passage of grease at pressure below 30 psi.

3 Claims, 3 Drawing Sheets

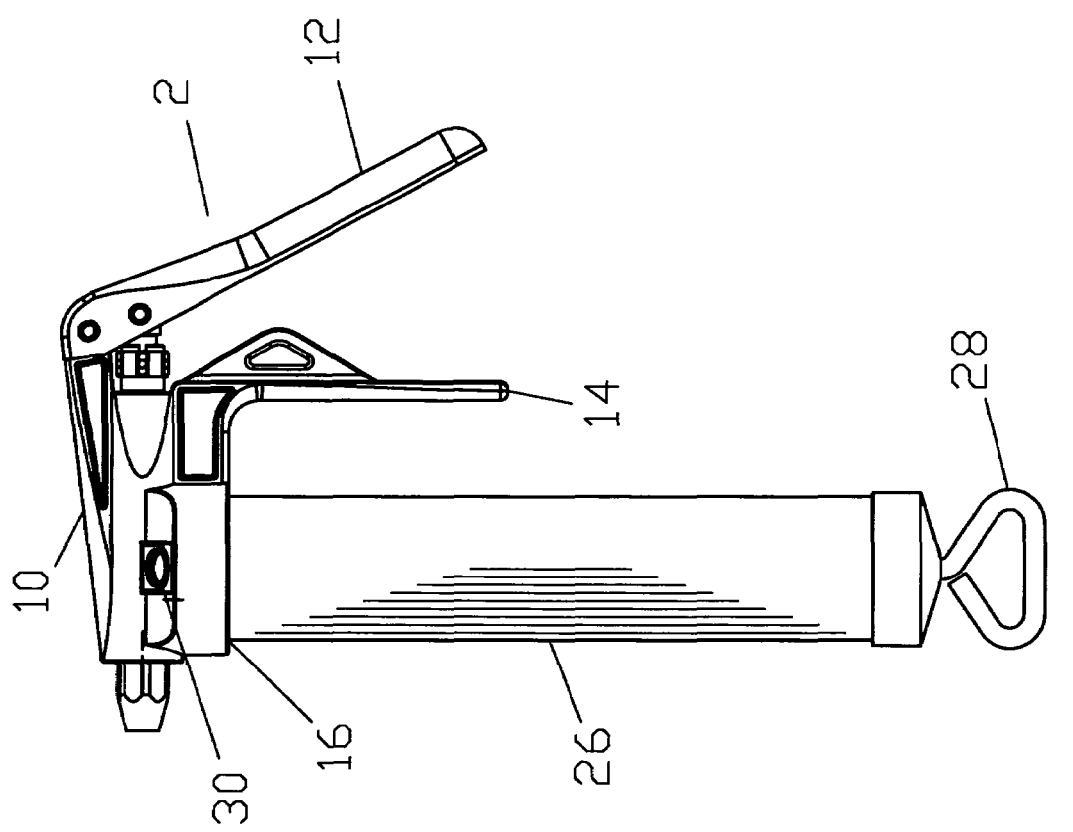

US 7,469,803 B2

GREASE GUN WITH REMOTE-FEED ADAPTER

CROSS-REFERENCE TO RELATED APPLICATIONS

This application claims priority from provisional patent application Ser. No. 60/562,355 titled Multipressure Portable Grease Gun, filed on Apr. 15, 2004, with the United States Patent and Trademark Office. The disclosure of provisional patent application Ser. No. 60/562,355 is hereby incorporated in its entirety.

BACKGROUND OF THE INVENTION

Portable grease guns are used throughout industry to provide a supply of pressurized grease to lubricate vehicles and myriad types of machinery. In the typical portable hand held grease gun, a grease gun body includes a screw mounting to which a grease "barrel" (a tube having one closed end and an open end) containing a quantity of grease or a grease cartridge may be attached to provide a source of grease for the grease gun. When the grease within the cartridge is exhausted, the barrel may be unmounted and a new cartridge inserted and the barrel remounted to the screw mounting of the grease gun body. Grease guns of this type are limited to use with a self contained grease barrel mounted to the grease gun body and carried with it. Such grease guns are useful when the user will need to move around a wide area to lubricate equipment zerks.

Other grease guns are provided with a coupling to a flexible hose connected to a grease supply which may rest on the ground or another surface and need not be carried by the user. Typical of such a grease supply is a container of bulk grease such as a pail or bucket or keg equipped with a hand operated or foot operated pump. As grease is needed in the grease gun body, the user pumps a charge of grease from the grease pail by operating the manual pump, thereby driving a supply of grease into the compression chamber of the grease gun. Existing grease guns of this nature allow for coupling to a grease hose only. This type of grease gun body is useful when the user may remain in a limited area while applying lubricating grease.

A need exists for versatile grease gun body which may be supplied by a grease barrel carried with the gun or by a larger supply of grease carried in a grease pail, barrel or keg and supplied to the grease gun barrel by a hose which may be coupled to the grease gun body.

The foregoing problems are addressed by the present grease gun invention.

BRIEF SUMMARY OF THE INVENTION

A portable grease gun is provided with the capability of being attached to either a grease containing barrel, or to a hose carrying grease from a grease supply container. The grease gun includes a threaded fitting which will receive a grease barrel which may be recharged through an inlet valve communicative with the interior of the grease barrel, or by replacing a cartridge within the barrel, or by suction from a bulk container. When the grease barrel is removed, an adapter may be substituted for the grease barrel which includes a fitting to which a hose may be mounted. The adapter includes external threads similar to those of the grease barrel, with the external threads receivable in the barrel mounting of the grease gun. The adapter includes a hose fitting which may be mounted opposite the barrel mounting. The hose fitting includes screw threads which will mate with a threaded hose fitting fixed to the end of a suitable hose for conveying grease from a pressurized grease pail, bucket, keg or other grease reservoir.

It is a primary object of the invention to provide a versatile portable grease gun which may be supplied from a self-contained grease reservoir mounted directly to the grease gun or from a supply of bulk grease contained in a reservoir such as a pail, bucket, or keg.

It is also an object of the invention to provide a portable manually operated grease gun which may be used in applications where the grease gun operator is not required to move about a wide area as well as for applications where the user must carry the grease gun to various locations.

It is a further object of the invention to provide a grease gun barrel adapter which may be fitted to the barrel mounting of a grease gun provided with a barrel mount to adapt the grease gun for supplying grease from a bulk source via a duct or hose.

These and other objects will be understood upon review of the detailed description which follows.

BRIEF DESCRIPTION OF THE SEVERAL VIEWS OF THE DRAWING(S)

FIG. 3 is a front elevation of the invention grease gun with a grease barrel mounted thereto.

DETAILED DESCRIPTION OF THE INVENTION

Figure 1:
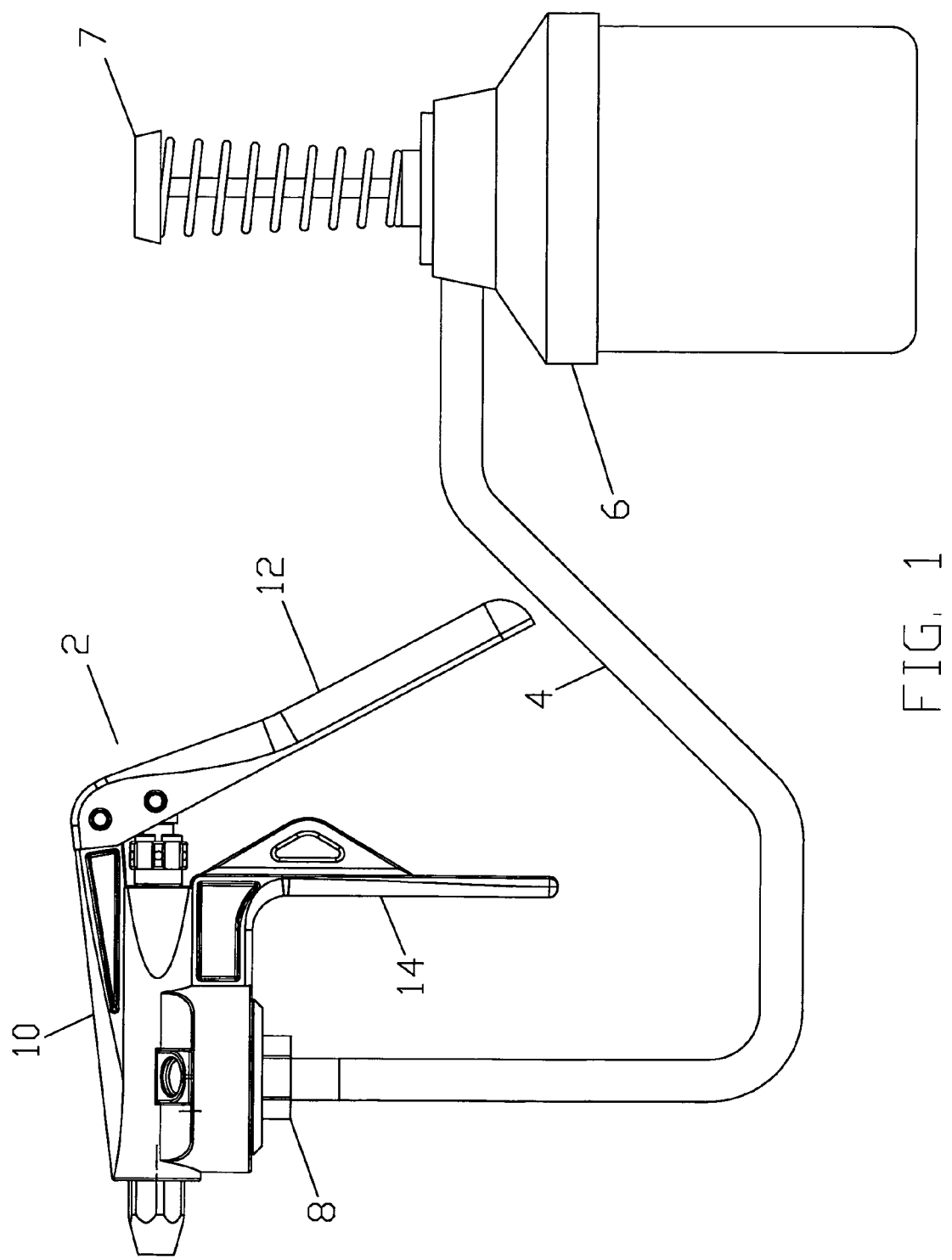
FIG. 1 is a front elevation of a grease gun according to the present invention, coupled via a hose to a grease reservoir.

FIG. 1 discloses a grease gun 2 according to the present invention, coupled by a flexible hose 4 to a grease reservoir 6. The hose 4 joins grease gun 2 at adapter 8 which is removeably mounted to grease gun body 10. In this configuration, grease from reservoir 6 may be forced by operation of first pump 7 through hose 4 and through adapter 8 into grease gun body 10. This figure shows actuating lever 12 in its retracted position, rotated away from handle 14.

Figure 2:
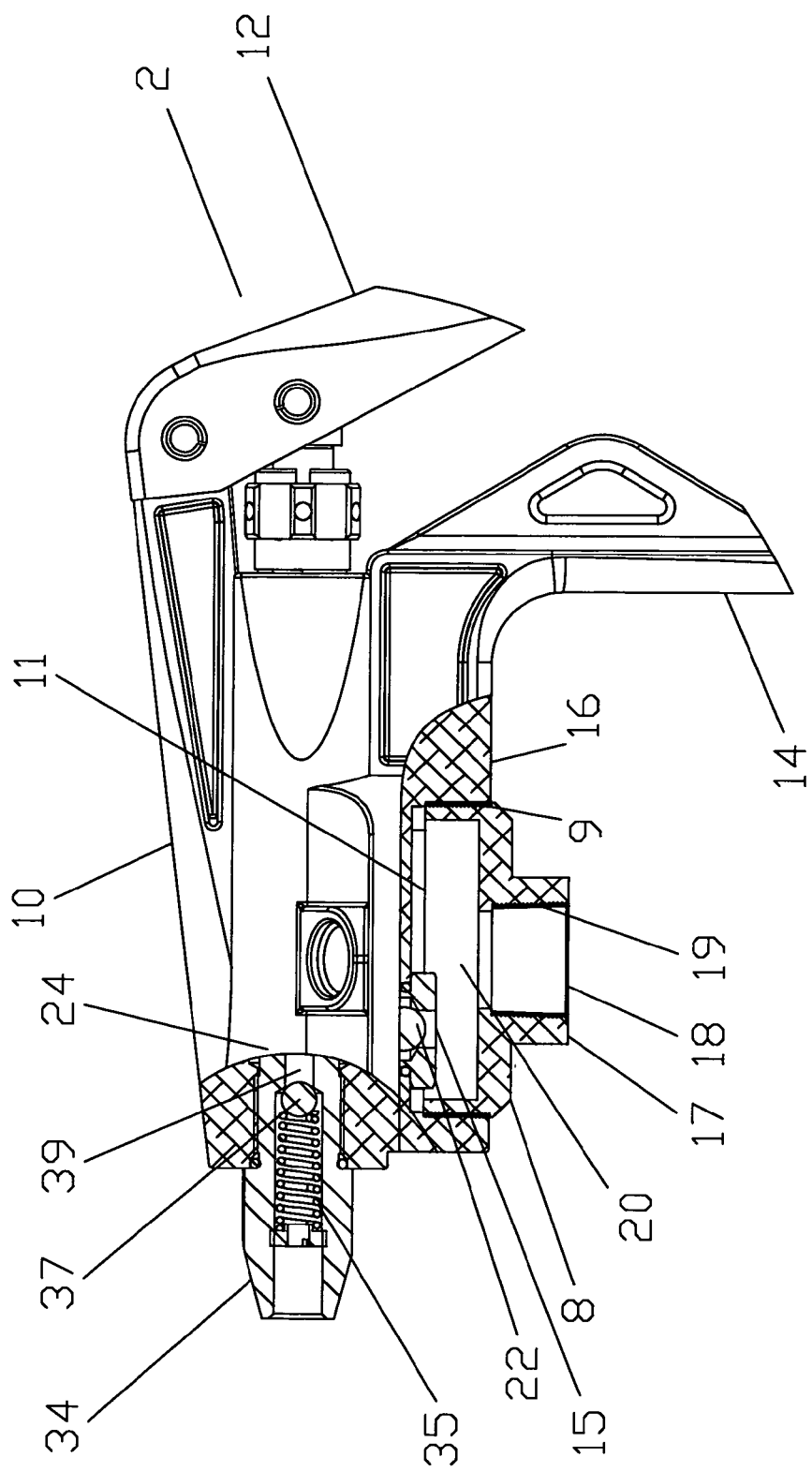
FIG. 2 is a partial section of the grease gun of FIG. 1 with parts of the handle and actuating lever cut away.

Referring now to FIG. 2, a partial cross section of the grease gun 2 shows that adapter 8 is mounted to grease gun body 10 at barrel mounting 16 preferably by screw threads 9. Barrel mounting 16 is configured to receive an end of a grease barrel but when a grease barrel is not mounted, adapter 8 may be screwed into barrel mounting 16. Adapter 8 includes a hose coupling 18 which, as illustrated in FIG. 2, may receive a male coupling of a hose and a swivel connection. Adapter 8 provides a grease compartment 20 in which grease is stored until it is forced past inlet valve 22 into pressure chamber 24 of grease gun body 10. Because adapter 8 is removable from grease gun body 10, a conventional grease barrel may be mounted in its place in barrel mounting 16. It should be understood that though a screw mounting is illustrated for barrel mounting 16, other mechanical attachments such as a bayonet mount could be substituted for the screw mounting shown.

Adapter 8 is preferably cylindrical in shape with an open first end 11 which is communicative with the barrel mounting 16 and therefore with inlet port 15 of grease gun body 10. First end 11 includes external screw threads for mating with internal screw threads of barrel mounting 16.

Adapter 8 includes second end 17 which houses hose coupling 18. Typically second end 17 will be smaller than first end 11. Second end 17 houses hose coupling 18 and is preferably equipped with internal threads 19 to receive a conventional end coupler of a grease hose.

Nozzle body 34 of grease gun body 10 includes an output check valve spring 35 which biases ball 37 to close outlet port 39. Check valve spring 35 is preferably selected to resist movement of ball 37 unless the pressure of grease in outlet port 39 exceeds approximately 150 psi though the pressure resistance of check valve spring 35 may be selected to provide resistance as low as about 30 psi. Increased check valve resistance is desired when grease is supplied to grease gun body 10 through a hose mounted to adapter 8 wherein grease pumped from a grease reservoir may easily exceed the pressure of grease in the conventional grease barrel illustrated in FIG. 3.

FIG. 3 illustrates the grease gun 2 with a conventional grease barrel 26 mounted to barrel mounting 16 of grease gun body 10. As with conventional grease guns, grease within grease barrel 26 is forced into grease gun body 10 by a coil spring (not shown) contained within grease barrel 26. The pressure of grease in a conventional grease barrel 26 typically does not exceed 16 psi. When the supply of grease in grease barrel 26 is exhausted, grease may be replenished within grease barrel 26 after plunger handle 28 is drawn from grease barrel 26 thereby compressing the coil spring within it. Grease can then be introduced through resupply port 30 mounted on grease gun body 10 which is communicative with the interior of grease barrel 26. Resupply port 30 is capped when not in use.

The foregoing description of the invention has been presented for purposes of illustration and description and is not intended to be exhaustive or to limit the invention to the precise form disclosed. Modifications and variations of the embodiments are possible in light of the above disclosure or such may be acquired through practice of the invention. The embodiments illustrated were chosen in order to explain the principles of the invention and its practical application to enable one skilled in the art to utilize the invention in various embodiments and with various modifications as are suited to the particular use contemplated. It is intended that the scope of the invention be defined by the claims appended hereto, and by their equivalents.

Having described the invention, we claim:

1. A hand-held grease gun for portable use comprising
a hand-held portable grease gun body including an input port and an output port,
the output port communicative with a first mounting adapted for receiving a self contained grease barrel,
the self contained grease barrel selectively removable from the first mounting,
an adapter for selective mounting to the first mounting when the grease barrel is removed therefrom,
the adapter comprising a first opening communicative with the first mounting,
the adapter comprising a second opening to receive a hose fitting,
an output check valve coupled to the output port of the grease gun body,
the output check valve permitting passage of grease only when the grease is at pressure above about 30 psi,
the second opening of the adapter comprises screw threads,
the screw threads of the second opening of the adapter selectively removably coupled to a grease conveying hose.

2. A hand-held grease gun for portable use comprising
a hand-held portable grease gun body including an input port and an output port,
the output port communicative with a first mounting adapted for receiving a self contained grease barrel,
the self contained grease barrel selectively removable from the first mounting,
an adapter for selective mounting to the first mounting when the grease barrel is removed therefrom,
the adapter comprising a first opening communicative with the first mounting,
the adapter comprising a second opening to receive a hose fitting,
an output check valve coupled to the output port of the grease gun body,
the output check valve permitting passage of grease only when the grease is at pressure above about 30 psi,
the grease gun body is manually operable to expel grease from the output port thereof,
the first mounting comprises internal screw threads,
the adapter including first screw threads matable with the internal screw threads of the first mounting,
the first screw threads of the adapter are external screw threads,
the adapter includes a chamber therein, the chamber communicative with the first opening of the adapter and also with the second opening thereof,
the second opening of the adapter comprises screw threads,
the screw threads of the second opening of the adapter selectively removably coupled to a grease conveying hose.

3. The hand-held grease gun for portable use of claim 2 wherein
the output check valve resists passage of grease therethrough when the grease is at pressure less than about 150 psi.

* * * * *